US012496263B2

(12) United States Patent
Schmid et al.

(10) Patent No.: US 12,496,263 B2
(45) Date of Patent: Dec. 16, 2025

(54) COMPOSITIONS AND RELATED METHODS

(71) Applicant: Colgate-Palmolive Company, New York, NY (US)

(72) Inventors: Svenia Schmid, Basel (CH); Thomas Schollbach, Basel (CH); Turan Matur, Binningen (CH); Andre Brunella, Dornach (CH)

(73) Assignee: Colgate-Palmolive Company, New York, NY (US)

( * ) Notice: Subject to any disclaimer, the term of this patent is extended or adjusted under 35 U.S.C. 154(b) by 621 days.

(21) Appl. No.: 17/632,179

(22) PCT Filed: Dec. 17, 2021

(86) PCT No.: PCT/US2021/064046
§ 371 (c)(1),
(2) Date: Feb. 1, 2022

(87) PCT Pub. No.: WO2022/133221
PCT Pub. Date: Jun. 23, 2022

(65) Prior Publication Data
US 2022/0401318 A1    Dec. 22, 2022

Related U.S. Application Data

(60) Provisional application No. 63/127,783, filed on Dec. 18, 2020.

(51) Int. Cl.
*A61K 8/21* (2006.01)
*A61K 8/24* (2006.01)
*A61K 8/41* (2006.01)
*A61Q 11/00* (2006.01)

(52) U.S. Cl.
CPC .................. *A61K 8/21* (2013.01); *A61K 8/24* (2013.01); *A61K 8/41* (2013.01); *A61Q 11/00* (2013.01); *A61K 2800/28* (2013.01)

(58) Field of Classification Search
CPC ... A61K 8/21; A61K 8/24; A61K 8/41; A61K 2800/28; A61Q 11/00
See application file for complete search history.

(56) References Cited

U.S. PATENT DOCUMENTS

| | | | |
|---|---|---|---|
| 3,535,421 A | 10/1970 | Briner et al. | |
| 3,678,154 A | 7/1972 | Widder et al. | |
| 4,842,847 A | 6/1989 | Amjad | |
| 4,866,161 A | 9/1989 | Sikes et al. | |
| 4,885,155 A | 12/1989 | Parran, Jr. et al. | |
| 6,464,962 B2 * | 10/2002 | Heckendorn | A61Q 11/00 424/49 |
| 2013/0209375 A1 * | 8/2013 | Moya Argilagos | A61K 8/416 424/52 |
| 2015/0366768 A1 | 12/2015 | Hug et al. | |
| 2020/0306159 A1 | 10/2020 | Xu et al. | |

FOREIGN PATENT DOCUMENTS

| | | | |
|---|---|---|---|
| CN | 1299786 | 6/2001 | |
| CN | 108430585 | 8/2018 | |
| GB | 756859 | 9/1956 | |
| JP | 2002069493 | 3/2002 | |
| WO | 2009/130319 | 10/2009 | |
| WO | WO-2017222963 A1 * | 12/2017 | ............. A01N 33/04 |
| WO | 2018145966 | 8/2018 | |
| WO | 0139737 | 6/2021 | |

OTHER PUBLICATIONS

Material Safety Data Sheet for Stannous Fluoride from Spectrum Chemical Corporation, dated Jan. 16, 2019; downloaded Sep. 2, 2024 from https://www.spectrumchemical.com/media/sds/S1542_AGHS.pdf?srsltid=AfmBOoqRfdom-CHKEgbrk_GNaakME8DXSu789jCw4TmohQ5Kjt9VIbby (Year: 2019).*
International Search Report and the Written Opinion of the International Searching Authority issued in International Application PCT/US2021/064046 mailed Apr. 7, 2022.
Tooth & Tongue Gel [retrieved from internet on Aug. 8, 2024] <URL: https://www.gnpd.com/sinatra/recordpage/1976781> Mintel, published Jan. 2013 as per Product Details.

* cited by examiner

*Primary Examiner* — Michael P Cohen

(57) ABSTRACT

The present disclosure relates to processes for the manufacture of compositions containing amine fluorides and mixtures of these amine fluorides. Related compositions and methods of use are further disclosed.

17 Claims, No Drawings

COMPOSITIONS AND RELATED METHODS

FIELD

The present invention relates to compositions containing amines, and a related process for the preparation of amine fluorides and their use in said compositions.

BACKGROUND

It is known that oral hygiene compositions, by their cleaning action, make a contribution to the hygiene of the oral cavity and thus to the preservation of the health of teeth and gums. The cleaning action of these oral hygiene compositions is customarily supplemented by admixture of active compounds which prevent or control pathological symptoms in the oral cavity, in particular also the formation of bacterial films on the teeth (i.e., plaque). These films consist of polysaccharides, primarily of dextrans. In addition to the low-molecular weight sugars, these polysaccharides form a source of nutrition for the plaque bacteria, which are mainly streptococci and lactobacillaceae. The plaque bacteria gradually break down the polysaccharides to form acidic degradation products (e.g., pyruvic acid, lactic acid, etc.). The pH decrease resulting therefrom brings about the degradation of the tooth enamel known as caries.

It has therefore already been attempted to take steps against the formation of pathological symptoms in the oral cavity using various oral hygiene compositions (e.g., toothpastes, rinsing solutions or dental gels). Active compounds already known the prior art include N-octadeca-9-enylamine hydrofluoride (international non-proprietary name "dectaflur") and N'-octadecyl-N',N,N-tris(2-hydroxyethyl)-1,3-propanediamine dihydrofluoride (international non-proprietary name "olaflur"). On oral use of the hygiene composition, these active compounds form a thin hydrophobic film on the tooth enamel, the amine hydrofluoride groups coming into contact with the tooth enamel. Thus, on the one hand the tooth enamel becomes more resistant to acid attacks on account of the $CaF_2$ covering layer formed, on the other hand the long-chain hydrocarbon residues form a hydrophobic layer which prevents the formation of deposits and the attack of the acidic degradation products on the tooth enamel.

However, while such compounds are effective when used in oral care compositions, their use can be costly due, in part, to the expenses associated with manufacture. Additionally, the current method of synthesizing involves the use of hydrofluoric acid, which is highly corrosive and poses a high safety risk when working with this material. Additionally, traditional methods of synthesizing amine fluoride use separate manufacture of the amine fluoride prior to addition to a final composition (e.g., oral care composition or personal care composition), which is costly and requires additional expenses for transport and handling. It would therefore be beneficial to synthesize amine fluorides in situ from amine bases of animal- or plant-derived origin without the use of hydrofluoric acid. Additionally, fatty acids for the synthesis of amine bases and the subsequent production of marketed amine fluorides are typically obtained from bovine tallow, which could have a negative impact on consumer preference in comparison with plant-derived fatty acid sources for the synthesis of amine bases. It would therefore be beneficial to use fatty acids of plant-derived origin for the production of amine bases and subsequent synthesis of amine fluorides in situ.

BRIEF SUMMARY

Provided herein are methods of in situ synthesis of amine fluorides from amine bases without the use of hydrofluoric acid. Related compositions (e.g., oral care compositions and/or personal care compositions) are also disclosed.

Thus, in a first aspect, the present disclosure is directed to a method of manufacturing an oral care or personal care composition, which includes the steps of mixing an amine base (e.g., a polyamine base) with an acid and a source of fluoride; and forming an amine fluoride in situ.

In a second aspect, the present disclosure is directed to an oral care or personal care composition comprising an amine base (e.g., a polyamine base) an acid and a source of fluoride; and forming an amine fluoride in situ.

DETAILED DESCRIPTION

As used herein, the term "oral care composition" means the total composition that is delivered to the oral surfaces. The composition is further defined as a product which, during the normal course of usage, is not, the purposes of systemic administration of particular therapeutic agents, intentionally swallowed but is rather retained in the oral cavity for a time sufficient to contact substantially all of the dental surfaces and/or oral tissues for the purposes of oral activity. Examples of such compositions include, but are not limited to, toothpaste or a dentifrice, a mouthwash or a mouth rinse, a topical oral gel, a denture cleanser, sprays, and the like.

As used herein, the term "dentifrice" means paste, gel, or liquid formulations unless otherwise specified. The dentifrice composition can be in any desired form such as deep striped, surface striped, multi-layered, having the gel surrounding the paste, or any combination thereof. Alternatively, the oral composition may be dual phase dispensed from a separated compartment dispenser.

As used herein, the term "personal care composition" is any composition that is suitable for administration or application to a human or animal subject for enhancing the health, hygiene or appearance of the subject, including the prevention or treatment of any physiologic condition or disorder, and providing sensory, decorative or cosmetic benefits and combinations thereof. Examples of such compositions include, but are not limited to antiperspirants, liquid hand soap or body wash, and skin lotions, creams, shampoos, conditioners, deodorants, and the like.

As used herein, the term "amine base" may refer to a primary amine base, a secondary amine base or a tertiary amine base. "Primary amine base" refers to a compound containing at least one amine in which the nitrogen atom is directly bonded to one carbon of any hybridization, except for carbonyl group carbons. "Secondary amine base" refers to a compound containing at least one amine in which the nitrogen atom is directly bonded to two carbons of any hybridization, except for carbonyl group carbons. "Tertiary amine base" refers to a compound containing at least one amine in which the nitrogen atom is directly bonded to three carbons of any hybridization, except for carbonyl group carbons. "Amine base" may be used to refer to compounds containing a plurality of primary, secondary and/or tertiary amine groups (e.g., a tertiary polyamine). In particular, the term "amine base" excludes acid addition salts (e.g., hydrochloride salts and hydrofluoride salts), and thus refers to the free base form of the molecule. Hydrofluoride derivatives of amines are referred to herein as "amine fluorides." In methods for the production or manufacture of a composition containing an amine fluoride, an amine base may be a precursor to forming the amine fluoride.

As used herein, the term "in situ" is used to refer to the formation of a chemical product (e.g., amine fluoride) in the oral care composition or the personal care composition. For example, the reaction may be a salination reaction carried out by mixing an amine with a fluoride source and an acid, thus creating an amine fluoride and a salt. In some embodiments, in situ excludes the possibility of formation of the reaction product in a first reaction vessel (for example, at a first location), and subsequent addition of the reaction product to a mixture, admixture, or solution in a second vessel (for example, at a second location) containing other ingredients of the oral care composition or personal care composition.

Methods of the Present Disclosure

In one aspect, the invention is a method [Method 1] of manufacturing an oral care or personal care composition, comprising the steps of mixing an amine base (e.g., polyamine base) with an acid and a source of fluoride; and forming an amine fluoride in situ. For example, the invention contemplates any of the following compositions (unless otherwise indicated, values are given as percentage of the overall weight of the composition):

1.1 Method 1.1, wherein the acid is an organic acid (e.g., lactic acid, citric acid, tartaric acid, fumaric acid, malic acid), phosphoric acid or hydrochloric acid.

1.2 The preceding method, wherein the organic acid is an aliphatic di- or tri-carboxylic acid in free or salt form.

1.3 Any of the preceding methods, wherein the organic acid is malic acid.

1.4 Any of the preceding methods, wherein the acid is hydrochloric acid.

1.5 Any of the preceding methods, wherein the acid is phosphoric acid.

1.6 Any of the preceding methods, wherein the acid is not hydrofluoric acid.

1.7 Any of the preceding methods, wherein the fluoride source is selected from one or more of stannous fluoride, sodium fluoride, potassium fluoride, sodium fluorosilicate, ammonium fluorosilicate, amine fluoride, ammonium fluoride, and combinations thereof.

1.8 Any of the preceding methods, wherein the fluoride source is selected from sodium fluoride, stannous fluoride and combinations thereof.

1.9 Any of the preceding methods, wherein the fluoride source is sodium fluoride.

1.10 Any of the preceding methods, wherein the fluoride source is stannous fluoride.

1.11 Any of the preceding methods, wherein the amine base is a primary amine, secondary amine, tertiary amine or a combination thereof.

1.12 Any of the preceding methods, wherein the amine base comprises or consists of a primary amine base.

1.13 Any of the preceding methods, wherein the amine base comprises or consists of a secondary amine base.

1.14 Any of the preceding methods, wherein the amine base comprises or consists of a tertiary amine base.

1.15 Any of the preceding methods, wherein the amine base is plant-derived.

1.16 Any of the preceding methods, wherein the amine base is animal-derived.

1.17 Any of the preceding methods, wherein the amine base is derived from bovine tallow.

1.18 Any of the preceding methods, wherein the amine base is derived from rapeseed oil or from rice bran oil.

1.19 Any of the preceding methods, wherein the amine base is a linear or branched fatty amine or polyamine, or mixtures thereof.

1.20 The preceding method, wherein the amine base is a saturated or unsaturated $C_{12-20}$ alkyl amine base or a saturated or unsaturated $C_{12-20}$ alkyl polyamine base, or mixtures thereof.

1.21 Any of the preceding methods, wherein the amine base is a myristyl, palmityl, linoleyl, oleyl, or stearyl amine or polyamine, or combinations thereof.

1.22 Any of the preceding methods, wherein the amine base is a polyamine (e.g., a monoamine base, a diamine base and/or a triamine base).

1.23 Any of the preceding methods, wherein the amine base is a monoamine base.

1.24 Any of the preceding methods, wherein the amine base is a diamine base.

1.25 Any of the preceding methods, wherein the amine base is a triamine base.

1.26 Any of the preceding methods, wherein the amine base comprises one or more of N'-octadecyltrimethylendiamine-N,N,N'-tris(2-ethanol), and/or N-octadeca-9-enylamine.

1.27 Any of the preceding methods, wherein the amine base is N'-octadecyltrimethylendiamine-N,N,N'-tris(2-ethanol).

1.28 Any of the preceding methods, wherein the amine base is N-octadeca-9-enylamine.

1.29 Any of the preceding methods, wherein the amine fluoride formed is one or more of N'-octadecyltrimethylendiamine-N,N,N'-tris(2-ethanol)-dihydrofluoride (olaflur) or N-octadeca-9-enylamine hydrofluoride (dectaflur).

1.30 Any of the preceding methods, wherein the amine fluoride formed is N'-octadecyltrimethylendiamine-N,N,N'-tris(2-ethanol)-dihydrofluoride (olaflur).

1.31 Any of the preceding methods, wherein the amine fluoride formed is N-octadeca-9-enylamine hydrofluoride (dectaflur).

1.32 Any of the preceding methods, wherein the amine base is present in the resulting mixture in an amount of about 0.1 wt. % to about 5 wt. %, based on the total weight of the composition.

1.33 Any of the preceding methods, wherein the composition has a pH below 7, e.g., a pH of about 3-6, e.g., a pH of about 4-5.

1.34 Any of the preceding methods, wherein the composition is an aqueous solution.

1.35 Any of the preceding methods, wherein the composition is an oral care composition.

1.36 The preceding method, wherein the composition is in the form of a toothpaste or a dentifrice, a mouthwash or a mouth rinse, a topical oral gel, a denture cleanser, or a dental spray.

1.37 Any of the preceding methods, wherein the composition is a personal care composition.

1.38 The preceding method, wherein the composition is an antiperspirant, a liquid hand soap or body wash, a skin lotion, a cream, a shampoo, a conditioner, or a deodorant.

1.39 Any of the preceding methods, further comprising the step of adding a metal ion source (e.g., zinc ion source, copper ion source, stannous ion source), surfactant, flavoring agent, chelating agent, anti-calculus agent, polymer, abrasive, humectant, and/or pH adjusting agent.

1.40 Any of the preceding methods, further comprising the step of adding a zinc ion source selected from zinc oxide, zinc citrate, zinc lactate, zinc phosphate and combinations thereof.

In a further aspect, the present disclosure is directed to compositions (e.g., Composition 1 or Compositions 1.1, et seq.) that are obtained or obtainable by the methods as set forth above (e.g., Method 1 or Methods 1.1, et seq.)

Compositions of the Present Disclosure

In another aspect, the invention is an oral care or personal care composition (Composition 1) comprising an amine fluoride, wherein the composition is obtained by or obtainable by the methods according to Method 1 or 1.1-1.40. For example, the invention contemplates any of the following compositions (unless otherwise indicated, values are given as percentage of the overall weight of the composition):

1.1 Composition 1, wherein the amine fluoride is formed in situ from an amine base, an acid and a fluoride ion source.
1.2 Composition 1 or 1.1, wherein the acid is an organic acid (e.g., lactic acid, citric acid, tartaric acid, fumaric acid, malic acid), phosphoric acid or hydrochloric acid.
1.3 The preceding composition, wherein the organic acid is an aliphatic di- or tri-carboxylic acid in free or salt form.
1.4 Any of the preceding compositions, wherein the organic acid is malic acid.
1.5 Any of the preceding compositions, wherein the acid is hydrochloric acid.
1.6 Any of the preceding compositions, wherein the acid is phosphoric acid.
1.7 Any of the preceding compositions, wherein the acid is not hydrofluoric acid.
1.8 Any of the preceding compositions, wherein the fluoride source is selected from one or more of stannous fluoride, sodium fluoride, potassium fluoride, sodium fluorosilicate, ammonium fluorosilicate, amine fluoride, ammonium fluoride, and combinations thereof.
1.9 Any of the preceding compositions, wherein the fluoride source is selected from sodium fluoride, stannous fluoride and combinations thereof.
1.10 Any of the preceding compositions, wherein the fluoride source is stannous fluoride.
1.11 Any of the preceding compositions, wherein the fluoride is sodium fluoride.
1.12 Any of the preceding compositions, wherein the amine base is a primary amine, secondary amine, tertiary amine or a combination thereof.
1.13 Any of the preceding compositions, wherein the amine base comprises or consists of a primary amine base.
1.14 Any of the preceding compositions, wherein the amine base comprises or consists of a secondary amine base.
1.15 Any of the preceding compositions, wherein the amine base comprises or consists of a tertiary amine base.
1.16 Any of the preceding compositions, wherein the amine base is plant-derived.
1.17 Any of the preceding compositions, wherein the amine base is animal-derived.
1.18 Any of the preceding compositions, wherein the amine base is derived from bovine tallow.
1.19 Any of the preceding compositions, wherein the amine base is derived from rapeseed oil or from rice bran oil.
1.20 Any of the preceding compositions, wherein the amine base is a linear or branched fatty amine or polyamine, or mixtures thereof.
1.21 The preceding composition, wherein the amine base is a saturated or unsaturated $C_{12-20}$ alkyl amine base or a saturated or unsaturated $C_{12-20}$ alkyl polyamine base, or mixtures thereof.
1.22 Any of the preceding compositions, wherein the amine base is a myristyl, palmityl, linoleyl, oleyl, or stearyl amine or polyamine, or combinations thereof.
1.23 Any of the preceding compositions, wherein the amine base is a polyamine (e.g., a monoamine base, a diamine base and/or a triamine base).
1.24 Any of the preceding compositions, wherein the amine base is a monoamine base.
1.25 Any of the preceding compositions, wherein the amine base is a diamine base.
1.26 Any of the preceding compositions, wherein the amine base is a triamine base.
1.27 Any of the preceding compositions, wherein the amine base comprises one or more of N'-octadecyltrimethylendiamine-N,N,N'-tris(2-ethanol), and/or N-octadeca-9-enylamine.
1.28 Any of the preceding compositions, wherein the amine base is N'-octadecyltrimethylendiamine-N,N,N'-tris(2-ethanol).
1.29 Any of the preceding compositions, wherein the amine base is N-octadeca-9-enylamine.
1.30 Any of the preceding compositions, wherein the amine fluoride formed is one or more of N'-octadecyltrimethylendiamine-N,N,N'-tris(2-ethanol)-dihydrofluoride (olaflur) or N-octadeca-9-enylamine hydrofluoride (dectaflur).
1.31 Any of the preceding compositions, wherein the amine fluoride formed is N'-octadecyltrimethylendiamine-N,N,N'-tris(2-ethanol)-dihydrofluoride (olaflur).
1.32 Any of the preceding compositions, wherein the amine fluoride formed is N-octadeca-9-enylamine hydrofluoride (dectaflur).
1.33 Any of the preceding compositions, wherein the amine base is present in the resulting mixture in an amount of about 0.1 wt. % to about 5 wt. %, based on the total weight of the composition.
1.34 Any of the preceding compositions, further comprising a stannous ion source.
1.35 The preceding composition, wherein the stannous source is selected from the group comprising stannous fluoride, stannous chloride, stannic fluoride, stannic chloride, stannic acetate, stannous acetate and combinations thereof.
1.36 Either of the two preceding compositions, wherein the stannous ion source is present in an amount of up to 0.90 wt. %, e.g., about 0.01 wt. % to about 0.9 wt. %, based on the total weight of the composition.
1.37 The preceding composition wherein the fluoride ion source is present in an amount of 0.005 wt. % to 2.5 wt. % (e.g., about 0.025 wt. % to about 0.145 wt. %) of the total composition weight.
1.38 Any of the preceding compositions, wherein the total fluoride content of the composition is in an amount of from 50 to 25,000 ppm (e.g., 750-7000 ppm, e.g., 1000-5500 ppm, e.g., about 250 ppm, 500 ppm, 1000 ppm, 1100 ppm, 1400 ppm, 1450 ppm, 2800 ppm, 5000 ppm, or 25000 ppm).

1.39 Any of the preceding compositions, further comprising polyvinyl pyrrolidine in an amount of about 2.20 wt. % to about 3.00 wt. %, based on the total weight of the composition.
1.40 Any of the preceding compositions, further comprising a basic amino acid (e.g., arginine) present in an amount corresponding to 1% to 15%, e.g., 3 wt. % to 10 wt. % of the total composition weight, about e.g., 1.5%, 4%, 5%, or 8%, wherein the weight of the basic amino acid is calculated as free form.
1.41 Any of preceding compositions, wherein the composition is ethanol-free.
1.42 Any of the preceding compositions, wherein the pH is below 7, e.g., a pH of about 3-6, e.g., a pH of about 4-5.
1.43 Any of the preceding compositions, further comprising an effective amount of one or more alkali phosphate salts, e.g., sodium, potassium or calcium salts, e.g., selected from alkali dibasic phosphate and alkali pyrophosphate salts, e.g., alkali phosphate salts selected from sodium phosphate dibasic, potassium phosphate dibasic, dicalcium phosphate dihydrate, calcium pyrophosphate, tetrasodium pyrophosphate, tetrapotassium pyrophosphate, sodium tripolyphosphate, disodium hydrogenorthophoshpate, monosodium phosphate, pentapotassium triphosphate and mixtures of any of two or more of these, e.g., in an amount of 0.01-20%, e.g., 0.1-8%, e.g., e.g., 0.1 to 5%, e.g., 0.3 to 2%, e.g., 0.3 to 1%, e.g., about 0.01%, about 0.1%, about 0.5%, about 1%, about 2%, about 5%, about 6%, by weight of the composition.
1.44 The preceding composition, wherein the polyphosphate is tetrasodium pyrophosphate.
1.45 The preceding composition, wherein the tetrasodium pyrophosphate is from 0.1-1.0 wt. % (e.g., about 0.5 wt. %).
1.46 Any of the preceding compositions, further comprising an abrasive or particulate (e.g., silica).
1.47 Any of the preceding compositions, further comprising a nonionic surfactant, wherein the nonionic surfactant is in an amount of from 0.5-5%, e.g., 1-2%, selected from poloxamers (e.g., poloxamer 407), polysorbates (e.g., polysorbate 20), polyoxyl hydrogenated castor oil (e.g., polyoxyl 40 hydrogenated castor oil), and mixtures thereof.
1.48 The preceding composition, wherein the poloxamer nonionic surfactant has a polyoxypropylene molecular mass of from 3000 to 5000 g/mol and a polyoxyethylene content of from 60 to 80 mol %, e.g., the poloxamer nonionic surfactant comprises poloxamer 407.
1.49 Any of the preceding compositions, further comprising a humectant selected from glycerin, sorbitol, xylitol, propylene glycol in an amount of about 10-70 wt. % based on the total weight of the composition.
1.50 Any of the preceding compositions, further comprising a zinc ion source selected from zinc oxide, zinc citrate, zinc lactate, zinc phosphate and combinations thereof.
1.51 Any of the preceding compositions, further comprising a zinc ion source comprising or consisting of a combination of zinc oxide and zinc citrate.
1.52 The preceding composition, wherein the ratio of the amount of zinc oxide (e.g., wt. %) to zinc citrate (e.g., wt. %) is from 1.5:1 to 4.5:1 (e.g., 2:1, 2.5:1, 3:1, 3.5:1, or 4:1).
1.53 Either of the two preceding compositions, wherein the zinc citrate is in an amount of from 0.25 to 1.0 wt. % (e.g., 0.5 wt. %) and zinc oxide may be present in an amount of from 0.75 to 1.25 wt. % (e.g., 1.0 wt. %) based on the weight of the oral care composition.
1.54 Any of the preceding compositions, comprising zinc citrate in an amount of about 0.5 wt. %.
1.55 Any of the preceding compositions, comprising zinc oxide in an amount of about 1.0 wt. %.
1.56 Any of the preceding compositions, wherein the zinc ion source is zinc lactate.
1.57 Any of the preceding compositions, further comprising a flavoring, fragrance and/or coloring agent.
1.58 Any of the preceding compositions, further comprising a thickening agent selected from the group consisting of carboxyvinyl polymers, carrageenan, xanthan, hydroxyethyl cellulose and water-soluble salts of cellulose ethers (e.g., sodium carboxymethyl cellulose and sodium carboxymethyl hydroxyethyl cellulose).
1.59 Any of the preceding compositions, further comprising an antibacterial agent selected from halogenated diphenyl ether (e.g. triclosan), herbal extracts and essential oils (e.g., rosemary extract, tea extract, magnolia extract, thymol, menthol, eucalyptol, geraniol, carvacrol, citral, honokiol, catechol, methyl salicylate, epigallocatechin gallate, epigallocatechin, gallic acid, miswak extract, sea-buckthorn extract), bisguanide antiseptics (e.g., chlorhexidine, alexidine or octenidine), quaternary ammonium compounds (e.g., cetylpyridinium chloride (CPC), benzalkonium chloride, tetradecylpyridinium chloride (TPC), N-tetradecyl-4-ethylpyridinium chloride (TDEPC), phenolic antiseptics, hexetidine, octenidine, sanguinarine, povidone iodine, delmopinol, salifluor, sanguinarine, propolis and oxygenating agents (e.g., buffered sodium peroxyborate or peroxycarbonate), phthalic acid and its salts, monoperthalic acid and its salts and esters, ascorbyl stearate, oleoyl sarcosine, alkyl sulfate, dioctyl sulfosuccinate, salicylanilide, domiphen bromide, delmopinol, octapinol and other piperidino derivatives, nicin preparations, chlorite salts; and mixtures of any of the foregoing.
1.60 Any of the preceding compositions, further comprising an antioxidant, e.g., selected from the group consisting of Co-enzyme Q10, PQQ, Vitamin C, Vitamin E, Vitamin A, BHT, anethole-dithiothione, and mixtures thereof.
1.61 Any of the preceding compositions, further comprising a whitening agent selected from the group consisting of metal chlorites, perborates, percarbonates, peroxyacids, hypochlorites, and combinations thereof.
1.62 Any of the preceding compositions, further comprising an agent that interferes with or prevents bacterial attachment, e.g. ethyl lauroyl arginiate (ELA) or chitosan.
1.63 Any of the preceding compositions, wherein the oral composition may be any of the following oral compositions selected from the group consisting of: a toothpaste or a dentifrice, a mouthwash or a mouth rinse, a topical oral gel, sprays, powders, strips, floss and a denture cleanser.
1.64 Any of the preceding compositions, wherein the composition is in the form of a cleanser such as a liquid hand soap formulation, body wash, or skin cleanser, or a home care formulation, e.g., a hard surface cleanser such as a dish soap, sunscreen, a makeup remover, or a topical disinfectant.

A composition obtained or obtainable by combining the ingredients as set forth in any of the preceding compositions.

In another embodiment, the invention encompasses a method to improve oral health comprising applying an effective amount of the oral composition of any of the embodiments set forth above to the oral cavity of a subject in need thereof, e.g., a method to
 i. reduce or inhibit formation of dental caries,
 ii. reduce, repair or inhibit early enamel lesions, e.g., as detected by quantitative light-induced fluorescence (QLF) or electrical caries measurement (ECM),
 iii. reduce or inhibit demineralization and promote remineralization of the teeth,
 iv. reduce hypersensitivity of the teeth,
 v. reduce or inhibit gingivitis,
 vi. promote healing of sores or cuts in the mouth,
 vii. inhibit microbial biofilm formation in the oral cavity,
 viii. raise and/or maintain plaque pH at levels of at least pH 5.5 following sugar challenge,
 ix. reduce plaque accumulation,
 x. treat dry mouth,
 xi. enhance systemic health, including cardiovascular health, e.g., by reducing potential for systemic infection via the oral tissues,
 xii. whiten teeth,
 xiii. reduce erosion of the teeth,
 xiv. immunize (or protect) the teeth against cariogenic bacteria and their effects, and/or
 xv. clean the teeth and oral cavity.

Fluoride Ion Source

The oral care compositions may further include one or more fluoride ion sources, e.g., soluble fluoride salts. A wide variety of fluoride ion-yielding materials can be employed as sources of soluble fluoride in the present compositions. Examples of suitable fluoride ion-yielding materials are found in U.S. Pat. No. 3,535,421, to Briner et al.; U.S. Pat. No. 4,885,155, to Parran, Jr. et al. and U.S. Pat. No. 3,678,154, to Widder et al., each of which are incorporated herein by reference. Representative fluoride ion sources used with the present invention (e.g., Composition 1.0 et seq.) include, but are not limited to, sodium fluoride, stannous fluoride, potassium fluoride, sodium fluorosilicate, ammonium fluorosilicate, amine fluoride, ammonium fluoride, and combinations thereof. In certain embodiments the fluoride ion source includes sodium fluoride, stannous fluoride as well as mixtures thereof. Where the formulation comprises calcium salts, the fluoride salts are preferably salts wherein the fluoride is covalently bound to another atom, e.g., as in sodium monofluorophosphate, rather than merely ionically bound, e.g., as in sodium fluoride.

Surfactants

In another embodiment, cationic surfactants useful in the present invention can be broadly defined as derivatives of aliphatic quaternary ammonium compounds having one long alkyl chain containing 8 to 18 carbon atoms such as lauryl trimethylammonium chloride, cetyl pyridinium chloride, cetyl trimethylammonium bromide, di-isobutylphenoxyethyldimethylbenzylammonium chloride, coconut alkyltrimethylammonium nitrite, cetyl pyridinium fluoride, and mixtures thereof. Illustrative cationic surfactants are the quaternary ammonium fluorides described in U.S. Pat. No. 3,535,421, to Briner et al., herein incorporated by reference. Certain cationic surfactants can also act as germicides in the compositions.

Illustrative nonionic surfactants of Composition 1.0, et seq., that can be used in the compositions of the invention can be broadly defined as compounds produced by the condensation of alkylene oxide groups (hydrophilic in nature) with an organic hydrophobic compound which may be aliphatic or alkylaromatic in nature. Examples of suitable nonionic surfactants include, but are not limited to, the Pluronics, polyethylene oxide condensates of alkyl phenols, products derived from the condensation of ethylene oxide with the reaction product of propylene oxide and ethylene diamine, ethylene oxide condensates of aliphatic alcohols, long chain tertiary amine oxides, long chain tertiary phosphine oxides, long chain dialkyl sulfoxides and mixtures of such materials. In a particular embodiment, the composition of the invention comprises a nonionic surfactant selected from poloxamers (e.g., poloxamer 407), polysorbates (e.g., polysorbate 20), polyoxyl hydrogenated castor oils (e.g., polyoxyl 40 hydrogenated castor oil), betaines (such as cocamidopropylbetaine), and mixtures thereof.

Illustrative amphoteric surfactants of Composition 1.0, et seq., that can be used in the compositions of the invention include betaines (such as cocamidopropylbetaine), derivatives of aliphatic secondary and tertiary amines in which the aliphatic radical can be a straight or branched chain and wherein one of the aliphatic substituents contains about 8-18 carbon atoms and one contains an anionic water-solubilizing group (such as carboxylate, sulfonate, sulfate, phosphate or phosphonate), and mixtures of such materials.

The surfactant or mixtures of compatible surfactants can be present in the compositions of the present invention in 0.1% to 5%, in another embodiment 0.3% to 3% and in another embodiment 0.5% to 2% by weight of the total composition.

Flavoring Agents

The oral care compositions of the invention may also include a flavoring agent. Flavoring agents which are used in the practice of the present invention include, but are not limited to, essential oils and various flavoring aldehydes, esters, alcohols, and similar materials, as well as sweeteners such as sodium saccharin. Examples of the essential oils include oils of spearmint, peppermint, wintergreen, sassafras, clove, sage, eucalyptus, marjoram, cinnamon, lemon, lime, grapefruit, and orange. Also useful are such chemicals as menthol, carvone, and anethole. Certain embodiments employ the oils of peppermint and spearmint.

The flavoring agent is incorporated in the oral composition at a concentration of 0.01 to 1.5% by weight.

Chelating and Anti-Calculus Agents

The oral care compositions of the invention also may include one or more chelating agents able to complex calcium found in the cell walls of the bacteria. Binding of this calcium weakens the bacterial cell wall and augments bacterial lysis.

Another group of agents suitable for use as chelating or anti-calculus agents in the present invention are the soluble pyrophosphates. The pyrophosphate salts used in the present compositions can be any of the alkali metal pyrophosphate salts. In certain embodiments, salts include tetra alkali metal pyrophosphate, dialkali metal diacid pyrophosphate, trialkali metal monoacid pyrophosphate and mixtures thereof, wherein the alkali metals are sodium or potassium. The salts are useful in both their hydrated and unhydrated forms. An effective amount of pyrophosphate salt useful in the present composition is generally enough to provide least 0.1 wt. % pyrophosphate ions, e.g., 0.1 to 3 wt. 5, e.g., 0.1 to 2 wt. %, e.g., 0.1 to 1 wt. %, e.g., 0.2 to 0.5 wt. %. The pyrophosphates also contribute to preservation of the compositions by lowering water activity.

Polymers

The oral care compositions of the invention also optionally include one or more polymers, such as polyethylene glycols, polyvinyl methyl ether maleic acid copolymers, polysaccharides (e.g., cellulose derivatives, for example carboxymethyl cellulose, or polysaccharide gums, for example xanthan gum or carrageenan gum). Acidic polymers, for example polyacrylate gels, may be provided in the form of their free acids or partially or fully neutralized water-soluble alkali metal (e.g., potassium and sodium) or ammonium salts. Certain embodiments include 1:4 to 4:1 copolymers of maleic anhydride or acid with another polymerizable ethylenically unsaturated monomer, for example, methyl vinyl ether (methoxyethylene) having a molecular weight (M.W.) of about 30,000 to about 1,000,000. These copolymers are available for example as Gantrez AN 139 (M.W. 500,000), AN 1 19 (M.W. 250,000) and S-97 Pharmaceutical Grade (M.W. 70,000), of GAF Chemicals Corporation.

Other operative polymers include those such as the 1:1 copolymers of maleic anhydride with ethyl acrylate, hydroxyethyl methacrylate, N-vinyl-2-pyrollidone, or ethylene, the latter being available for example as Monsanto EMA No. 1 103, M.W. 10,000 and EMA Grade 61, and 1:1 copolymers of acrylic acid with methyl or hydroxyethyl methacrylate, methyl or ethyl acrylate, isobutyl vinyl ether or N-vinyl-2-pyrrolidone.

Suitable generally, are polymerized olefinically or ethylenically unsaturated carboxylic acids containing an activated carbon-to-carbon olefinic double bond and at least one carboxyl group, that is, an acid containing an olefinic double bond which readily functions in polymerization because of its presence in the monomer molecule either in the alpha-beta position with respect to a carboxyl group or as part of a terminal methylene grouping. Illustrative of such acids are acrylic, methacrylic, ethacrylic, alpha-chloroacrylic, crotonic, beta-acryloxy propionic, sorbic, alpha-chlorsorbic, cinnamic, beta-styrylacrylic, muconic, itaconic, citraconic, mesaconic, glutaconic, aconitic, alpha-phenylacrylic, 2-benzyl acrylic, 2-cyclohexylacrylic, angelic, umbellic, fumaric, maleic acids and anhydrides. Other different olefinic monomers copolymerizable with such carboxylic monomers include vinylacetate, vinyl chloride, dimethyl maleate and the like. Copolymers contain sufficient carboxylic salt groups for water-solubility.

A further class of polymeric agents includes a composition containing homopolymers of substituted acrylamides and/or homopolymers of unsaturated sulfonic acids and salts thereof, in particular where polymers are based on unsaturated sulfonic acids selected from acrylamidoalykane sulfonic acids such as 2-acrylamide 2 methylpropane sulfonic acid having a molecular weight of about 1,000 to about 2,000,000, described in U.S. Pat. No. 4,842,847, Jun. 27, 1989 to Zahid, incorporated herein by reference.

Another useful class of polymeric agents includes polyamino acids, particularly those containing proportions of anionic surface-active amino acids such as aspartic acid, glutamic acid and phosphoserine, as disclosed in U.S. Pat. No. 4,866,161 Sikes et al., incorporated herein by reference.

In preparing oral care compositions, it is sometimes necessary to add some thickening material to provide a desirable consistency or to stabilize or enhance the performance of the formulation. In certain embodiments, the thickening agents are carboxyvinyl polymers, carrageenan, xanthan gum, hydroxyethyl cellulose and water-soluble salts of cellulose ethers such as sodium carboxymethyl cellulose and sodium carboxymethyl hydroxyethyl cellulose. Natural gums such as karaya, gum arabic, and gum tragacanth can also be incorporated. Colloidal magnesium aluminum silicate or finely divided silica can be used as component of the thickening composition to further improve the composition's texture. In certain embodiments, thickening agents in an amount of about 0.5% to about 5.0% by weight of the total composition are used.

Abrasives

In certain embodiments the invention may comprise additional silica abrasives, sodium metaphosphate, potassium metaphosphate, aluminum silicate, calcined alumina, bentonite or other siliceous materials, or combinations thereof. Any silica suitable for oral care compositions may be used, such as precipitated silicas or silica gels. For example, synthetic amorphous silica. Silica may also be available as a thickening agent, e.g., particle silica. For example, the silica can also be small particle silica (e.g., Sorbosil AC43 from PQ Corporation, Warrington, United Kingdom).

Water

Water is present in the oral compositions of the invention. Water, employed in the preparation of commercial oral compositions should be deionized and free of organic impurities. Water commonly makes up the balance of the compositions and includes 5% to 99%, e.g., 10% to 20%, e.g., 25-35%, by weight of the oral compositions. This amount of water includes the free water which is added plus that amount which is introduced with other materials such as with sorbitol or silica or any components of the invention. The Karl Fischer method is a one measure of calculating free water.

Humectants

Within certain embodiments of the oral compositions, it is also desirable to incorporate a humectant to reduce evaporation and also contribute towards preservation by lowering water activity. Certain humectants can also impart desirable sweetness or flavor to the compositions. The humectant, on a pure humectant basis, generally includes 15% to 70% in one embodiment or 30% to 65% in another embodiment by weight of the composition.

Suitable humectants include edible polyhydric alcohols such as glycerin, sorbitol, xylitol, propylene glycol as well as other polyols and mixtures of these humectants. Mixtures of glycerin and sorbitol may be used in certain embodiments as the humectant component of the compositions herein.

pH Adjusting Agents

In some embodiments, the compositions of the present disclosure contain a buffering agent. Examples of buffering agents include anhydrous carbonates such as sodium carbonate, sesquicarbonates, bicarbonates such as sodium bicarbonate, silicates, bisulfates, phosphates (e.g., monopotassium phosphate, dipotassium phosphate, tribasic sodium phosphate, sodium tripolyphosphate, phosphoric acid), citrates (e.g. citric acid, trisodium citrate dehydrate), pyrophosphates (sodium and potassium salts) and combinations thereof. The amount of buffering agent is sufficient to provide a pH of about 5 to about 9, preferable about 6 to about 8, and more preferable about 7, when the composition is dissolved in water, a mouth rinse base, or a toothpaste base. Typical amounts of buffering agent are about 5% to about 35%, in one embodiment about 10% to about 30%, in another embodiment about 15% to about 25%, by weight of the total composition.

The present invention in its method aspect involves applying to the oral cavity a safe and effective amount of the compositions described herein.

The compositions and methods according to the invention (e.g., Composition 1.0 et seq) can be incorporated into oral compositions for the care of the mouth and teeth such as toothpastes, transparent pastes, gels, mouth rinses, sprays and chewing gum.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls. It is understood that when formulations are described, they may be described in terms of their ingredients, as is common in the art, notwithstanding that these ingredients may react with one another in the actual formulation as it is made, stored and used, and such products are intended to be covered by the formulations described.

The following examples further describe and demonstrate illustrative embodiments within the scope of the present invention. The examples are given solely for illustration and are not to be construed as limitations of this invention as many variations are possible without departing from the spirit and scope thereof. Various modifications of the invention in addition to those shown and described herein should be apparent to those skilled in the art and are intended to fall within the appended claims.

EXAMPLES

Example 1: Preparation of Compositions According to the Present Disclosure

Various compositions were prepared via one-pot synthesis or via pre-mix. In the case of the one-pot synthesis, an amine base was mixed with an acid and a source of fluoride in an aqueous solution. Each composition contained identical amounts of amine base. Further ingredients were added, as described below. The compositions created via one-pot synthesis are summarized in Table 1.

TABLE 1

Compositions created via one-pot synthesis

| | Formulation 1 (wt. %) | Formulation 2 (wt. %) | Formulation 3 (wt. %) | Formulation 4 (wt. %) |
|---|---|---|---|---|
| Water and humectant | q.s. | q.s. | q.s. | q.s. |
| Silica | 17.5 | 17.5 | 17.5 | 17.5 |
| Thickener | 2.25 | 2.25 | 2.25 | 2.25 |
| Flavorants | 0.8 | 0.8 | 0.8 | 0.8 |
| Amine Base | 0.1-3.0# | 0.1-3.0# | 0.1-3.0# | 0.1-3.0# |
| Sodium Fluoride | 0.221# | 0.221# | 0.221# | 0.221# |
| Phosphoric Acid (85%) | 0.6087# | — | — | — |
| Lactic Acid (90%) | — | 0.75# | — | — |
| Malic Acid (100%) | — | — | 0.55# | — |
| Hydrochloric Acid (32%) | — | — | — | 0.6# |
| Fluoride Content (ppm) | 1000 | 1000 | 1000 | 1000 | represents in situ formation of an amine fluoride.

Similar compositions were prepared via pre-mix. An amine base was mixed with an acid and a source of fluoride in a first aqueous solution. A second solution comprising ingredients as summarized below was prepared, and the two solutions were combined. As shown below, Formulation 6 was a toothpaste, while Formulation 7 was a mouthwash. The compositions created via pre-mix synthesis are summarized in Table 2.

TABLE 2

Compositions created via pre-mix synthesis

| | Formulation 6 (wt. %) | Formulation 7 (wt. %) |
|---|---|---|
| Water and humectant | q.s. | q.s. |
| Silica | 22.5 | — |
| Surfactants/Polymers | — | 0.55 |
| Thickener | 2.2 | — |
| Flavorants/Colorants | 2.45 | 0.21 |
| Amine Base | 0.1-3.0# | 0.1-3.0# |
| Sodium Fluoride | 0.31# | 0.0288# |
| Stannous Fluoride | — | 0.0541 |
| Hydrochloric Acid (32%) | 0.84# | 0.078# |
| Fluoride Content (ppm) | 1400 | 250 | represents in situ formation of an amine fluoride.

Example 2: Fluoride Uptake Study

Studies were carried out to evaluate the effect of treatment time and dilution on the ability of oral care products to promote fluoride uptake. The test procedure is a modification of Test Method #40 in the FDA Monograph, which includes the formation of a caries-like (subsurface) lesion that is formed using a solution of 0.1M lactic acid and 0.2% Carbopol 907, 50% saturated with HAP at a pH of 5.0. Enamel microbiopsies are conducted using modification of the microdrill enamel biopsy technique as described by Sakkab et al. to analyze the fluoride content of partially demineralized enamel.

The results were summarized below in Table 3.

TABLE 3

Fluoride Uptake Results

| Composition | | Average Pre-Treatment Fluoride (ppm) | Average Post-Treatment Fluoride (ppm) | Fluoride Uptake (ppm) |
|---|---|---|---|---|
| Formulation 1 | Mean | 67.7 | 1720.6 | 1653.0 |
| | Standard Deviation | 21.4 | 170.5 | 176.7 |
| | SEM | 6.2 | 49.2 | 51.0 |
| Marketed product (1000 ppm F- from Olaflur) | Mean | 69.7 | 1646.1 | 1576.3 |
| | Standard Deviation | 26.7 | 187.5 | 199.6 |
| | SEM | 7.7 | 54.1 | 57.6 |
| Formulation 6 | Mean | 83.96 | 1455.74 | 1371.78 |
| | Standard Deviation | 33.10 | 262.29 | 248.88 |
| | SEM | 9.55 | 75.72 | 71.85 |
| Marketed product (1400 ppm F- from Olaflur) | Mean | 120.31 | 1397.37 | 1277.07 |
| | Standard Deviation | 115.76 | 190.56 | 215.33 |
| | SEM | 34.90 | 57.46 | 64.93 |
| Formulation 7 | Mean | 84.6 | 3276.3 | 3191.7 |
| | Standard Deviation | 41.1 | 851.3 | 855.2 |
| | SEM | 12.4 | 256.7 | 257.8 |
| Marketed product (250 ppm F- from Olaflur and SnF2) | Mean | 77.0 | 2795.9 | 2718.9 |
| | Standard Deviation | 33.5 | 701.8 | 696.4 |
| | SEM | 9.7 | 202.6 | 201.0 |

While the present invention has been described with reference to embodiments, it will be understood by those skilled in the art that various modifications and variations may be made therein without departing from the scope of the present invention as defined by the appended claims.

The invention claimed is:

1. A method of manufacturing an oral care or personal care composition, comprising the steps of:
   a. mixing an amine base with an acid and a source of fluoride, wherein the acid is not hydrofluoric acid;
   b. forming an amine fluoride in situ; and
   c. adding one or more ingredients to form an oral care or personal care composition.

2. The method according to claim 1, wherein the acid comprises phosphoric acid or hydrochloric acid.

3. The method according to claim 1, wherein the acid is comprises hydrochloric acid, phosphoric acid, or malic acid.

4. The method according to claim 1, wherein the fluoride source is selected from one or more of stannous fluoride, sodium fluoride, potassium fluoride, amine fluoride, ammonium fluoride, and combinations thereof.

5. The method according to claim 1, wherein the amine base is plant-derived.

6. The method according to claim 1, wherein the amine base is animal-derived.

7. The method according to claim 1, wherein the amine base is derived from bovine tallow.

8. The method according to claim 1, wherein the amine base is derived from rapeseed oil or from rice bran oil.

9. The method according to claim 1, wherein the amine base is a linear or branched fatty amine or polyamine.

10. The method according to claim 1, wherein the amine base is a saturated or unsaturated $C_{12-20}$ alkyl amine base or a saturated or unsaturated $C_{12-20}$ alkyl polyamine base.

11. The method according to claim 1, wherein the amine base is a myristyl, palmityl, linoleyl, oleyl, or stearyl amine or polyamine, or N'-octadecyltrimethylendiamine-N,N,N'-tris(2-ethanol), or N-octadeca-9-enylamine, and combinations thereof.

12. The method according to claim 1, wherein the amine base is a polyamine.

13. The method according to claim 1, wherein the amine base is present in the resulting mixture in an amount of about 0.1 wt. % to about 5 wt. %, based on the total weight of the composition.

14. The method according to claim 1, further comprising the step of adding a metal ion source, surfactant, flavoring agent, chelating agent, anti-calculus agent, polymer, abrasive, humectant, and/or pH adjusting agent.

15. The method according to claim 1, wherein the composition is in the form of a toothpaste or a dentifrice, a mouthwash or a mouth rinse, a topical oral gel, a denture cleanser, or a dental spray.

16. The method according to claim 1, wherein the composition is an antiperspirant, a liquid hand soap or body wash, a skin lotion, a cream, a shampoo, a conditioner, or a deodorant.

17. A composition comprising an amine base, an acid and a fluoride source, wherein the composition is obtained by or obtainable by the method according to claim 1.

* * * * *